United States Patent [19]
Waheed et al.

[11] Patent Number: 5,878,427
[45] Date of Patent: Mar. 2, 1999

[54] METHOD AND SYSTEM FOR ASSEMBLING COMPLEX OBJECTS

[75] Inventors: Syed Shahul Waheed, Dallas, Tex.; José A. Blakeley, Bothell, Wash.

[73] Assignee: Texas Instruments Incorporated, Dallas, Tex.

[21] Appl. No.: 455,827

[22] Filed: May 31, 1995

[51] Int. Cl.$^6$ ..................................................... G06F 17/30
[52] U.S. Cl. ............................ 707/103; 707/100; 707/10
[58] Field of Search .................................... 395/614, 613; 707/103, 100, 101, 10

[56] References Cited

U.S. PATENT DOCUMENTS

| | | | |
|---|---|---|---|
| 5,630,125 | 5/1997 | Zellweger | 707/103 |
| 5,649,190 | 7/1997 | Sharif-Askarary et al. | 707/101 |

OTHER PUBLICATIONS

Fu et al, A Concurrent Programming Enviroment for Memory–Mapped Persistent Objecta System, IEEE, pp. 291–298 Nov. 1993.

Lee et al. A database Computer Architeecture Performance Evaluation System, IEEE, pp. 148–155 Apr. 1992.

Wasserman et al. The Object Oriented Structure Design Notation for Software Design Representation, IEEE, pp. 61–63 Mar. 1990.

Keller et al, Efficient Assembly of Complex Objects, ACM SIGMOD Conference, pp. 148–157 1991.

Keller et al, Efficient Assembly of Complex Objects, ACM SIGMOD Conference, pp. 148–157. Dec. 1991.

"Architecture of an Open–Oriented Database Management System", Wells, et al., Computer (ISSN 0018–9162), IEEE Comptuer Society, vol. 25, No. 10, Oct. 1992, pp. 74–82.

"Experiences Building the Open OODB Query Optimizer", Blakeley, et al., Proceedings of the 1993 ACM SIGMOD International Conference on the Management of Data, vol. 22, Issue 2, Jun. 1993, pp. 287–296.

"OQL[C++]: Extending C++ with an Object Query Capability", Jos´´A. Blakely, Modern Database Systems: The Object Model, Interoperability, and Beyond, Won Kim (ed.), ACM Press/Addison–Wesley Publishing Co., 1995, ISBN 0–201–59098–0, pp. 69–88.

"A Query Algebra for Object–Oriented Databases†", Shaw, et al., Sixth International Conference on Data Engineering, IEEE Computer Society, Computer Society Press, Feb. 1990, pp. 154–162.

"Query Optimazation in Object–Oriented Database System: A Prospectus", Graefe, et al., Advances in Object–Oriented Database Systems, vol. 334, K.R. Dittrich (ed.), Spring–Verlag, Sep. 1988, pp. 358–363.

"Zeitgeist: Database Support for Object–Oriented Programming", Ford, et al., Advances in Object–Oriented Database Systems, 2nd International Workshop on Object–Oriented Database Systems, Springer Verlag, Sep. 1988, pp. 23–42.

Graete, Keller, and Maier, *"Efficient Assembly of Complex Objects"*, ACM SIGMOD 1991 Conference, pp. 148–157.

*Primary Examiner*—Thomas G. Black
*Assistant Examiner*—Greta L. Robinson
*Attorney, Agent, or Firm*—Tammy L. Williams; W. Daniel Swayze, Jr.; Richard L. Donaldson

[57] ABSTRACT

An assembly module (201) is used to assemble complex objects from a plurality of objects stored on a disk of a server (80) in response to user queries in an object-oriented database executing in a client-server environment or multiprocessor. Each complex object comprises a plurality of objects including a root object and a plurality of logically related sub-objects. Each object has an associated disk storage location, indicating where on the disk the object is stored. Each object may also include references to other objects. A list references to root objects of the complex objects needed to process a given query is provided in input list (202) to the assembly module (201) and stored in a reference list (204). A predetermined number of references in the reference list which are closest to the current disk head position are resolved into memory. Multiple objects are thus fetched from the disk in a single disk access. If the resolved objects includes references to other objects, those references are added to the reference list (204). All references in the reference list are processed in this manner until all of the complex objects involved in the query are assembled.

4 Claims, 6 Drawing Sheets

METHOD AND SYSTEM FOR ASSEMBLING COMPLEX OBJECTS

This invention was made with Government support sponsored by the Advanced Research Projects Agency under ARPA Order No. A719 and managed by the U.S. Army Research Laboratory under contract DAAA15-94-C-0009. The Government has certain rights in this invention.

NOTICE

Copyright© 1994 Texas Instruments Incorporated

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD OF THE INVENTION

The present invention relates to database queries in an object-oriented database and more particularly to a method and system for assembling complex objects in a client/server environment.

BACKGROUND OF THE INVENTION

Relational database management systems (RDBMSs) provide a simple and well-understood model of data. The simplicity and theory of the relational model result in efficient implementations of RDBMSs. However, relational database management systems are deficient at modeling complex data for certain applications such as engineering, manufacturing, office information systems and multi-media.

Object-oriented database management systems (OODBMSs) attempt to overcome the deficiencies of RDMBSs by incorporating features such as complex data modeling, encapsulated behavior, and inheritance (see R. Elmasri and S. Navathe, *Fundamentals of Database Systems*, Second Edition, Benjamin/Cummings, 1994, hereinafter referred to as "Navathe et al.").

In addition, a new class of database management systems (DBMSs), called "object-relational" DBMSs (ORDBMSs), is emerging. ORDBMSs attempt to combine the best features of RDBMSs (e.g., efficient query processing, high-performance transaction management, and security) with the best features of OODBMSs (e.g., support for complex user-defined types, high-performance, and navigational access). ORDBMSs, which may become the next plateau in database technology, may be built by extending existing OODBMSs with robust relational capabilities (e.g., SQL queries, and transaction management), or by extending existing RDBMSs with object support.

Between 1985 and 1990, the assignee, Texas Instruments Incorporated (TI), developed the Zeitgeist OODBMS (see S. Ford, et al., "ZEITGEIST: Database Support for Object-Oriented Programming", *Advances in Object-Oriented Database Systems, 2nd International Workshop on Object-Oriented Database Systems*, Springer Verlag, September 1988, 23–42, hereinafter referred to as "Ford et al."). Experience from this project indicated that the applications with varying database management needs can be better served by an open, extensible OODBMS rather than by a single monolithic DBMS in that the functionality of the open, extensible OODBMS can be tailored depending on the requirements of the application.

This experience motivated TI to initiate a project called Open Object-Oriented Database (OODB) (see David L. Wells, José Blakeley, and Craig W. Thompson, "Architecture of an Open Object-Oriented Database Management System", *Special Issue on Object-Oriented Systems and Applications, IEEE Computer*, Vol. 25 No. 10, pp. 74–82, October 1992, hereinafter referred to as "Wells et al."). The Open OODB project is an effort to describe the design space of OODBMSs, to build an architectural framework that enables configuring independently useful modules to form an OODBMS, to verify the suitability of the open approach by implementing an OODBMS to the architectural framework, and to determine areas where internal interface consensus exists or is possible.

In the object-oriented research community there also exists work on object query processing including object algebras and query optimization (see G. M. Shaw and S. B. Zdonik, "A Query Algebra for Object-Oriented Databases", *Proceedings of IEEE Conference on Data Engineering*, February 1990, 154, hereinafter referred to as "Shaw et al."; and see also G. Graefe and D. Maier, "Query Optimization in Object-oriented Database Systems: A Prospectus", *Advances in Object-oriented Database Systems*, Vol. 334, K. R. Dittrich (ed.), Springer-Verlag, September 1988, 358, hereinafter referred to as "Graefe et al."). Less work exists, however, in the area of query execution.

Thus, TI's Open OODB query component attempts to examine query execution problems and to demonstrate how an OODBMS can be extended with an efficient query capability. The TI open OODB query component currently includes a C++ and structured query language (SQL) based object query language (OQL[C++]), an object query execution engine and an extensible query optimizer.

An overview of the Open OODB system architecture and it's query processing module is found in an article by Jose A. Blakeley (see José A. Blakeley, "OQLL[C++]: Extending the C++ with an Object Query Capability", *Modern Database Systems: The Object Model, Interoperability, and Beyond*, Won Kim (ed.), ACM Press/Addison-Wesley, 1995, hereinafter referred to as "Blakeley"; see also David L. Wells, "DARPA Open Object-Oriented Database Architecture Specification", *Technical Report Version 6, DARPA Open OODB Project*, Computer Science Laboratory, Texas Instruments, Inc., November 1991, hereinafter referred to as "Wells"; see also Wells et al.).

FIG. 1 shows an exemplary architecture for the Open OODB. The exemplary architecture shown in FIG. 1 includes an application 100, which interacts with an exemplary OODBMS 104 both directly, as illustrated at 101, or indirectly through an application program interface (API) 102. The exemplary OODBMS 104 manages a collection of data stored as objects on a database server 80 as shown in exemplary client-server system in FIG. 2. The server 80, on which the exemplary OODBMS 104 executes, is coupled, through a computer network 82, to a plurality of clients 84, 86, 88, 90 and 92 on which the application 100 executes.

Also shown in FIG. 1, the exemplary OODBMS 104 is operable to perform several functions, each of which is implemented by a specific policy performer module. The exemplary OODBMS 104 includes a persistence policy perform module 106 which controls object persistence and object naming. Also included is a distribution policy performer module 108 which controls distributed access to objects. A transaction policy performer module 110 manages transactions and controlled sharing of objects. An object query processing module 112 manages object queries.

Table 1, shown hereinbelow, includes a list of these and other policy performer modules which may be included in the exemplary OODBMS 104. The actual set used in determined by functional requirements being addressed by each particular instantiation.

TABLE 1

Extended behaviors implemented by different policy performer modules

| Policy Performer Module Name | Description |
| --- | --- |
| Transaction | Transactions and controlled sharing. |
| Distribution | Distribution access to objects. |
| Replication | Replicated/partitioned objects. |
| Index | Indexed set of objects. |
| Object Query Processor | Object queries |
| Version | Versions of objects |
| Configuration | Configuration of objects |
| Dependency | Consistency and management of derived objects. |
| Persistence | Object persistence and naming. |
| Access Control | Provides security control over objects. |
| Gateway | Provides access to objects in foreign databases. |

Various support modules 114 are also included in the exemplary OODBMS 104, which is shown in FIG. 1. These support modules 114 include a plurality of address space managers (ASMs) 116, a communications manager 118, a translator 120 and a data dictionary 122. At least one of the plurality of ASMs 116 must allow execution of events. If more than one address space exists, there must be a communications manager 118 and a translator 120 operable to effect object transfer between them. The data dictionary 122 serves as a globally known repository of system, object, name and type information for use by all of the modules which make up the exemplary OODBMS 104.

FIG. 3 illustrates in detail the object query processing module 112 of the exemplary OODBMS 104. The object query processing module 112 includes a parser module 132, a simplification module 136, an optimization module 140, a compilation module 144 and an execution module 146.

An OQL[C++] query, entered at 130, is first parsed into an internal parse graph 134 representation by the parse module 132. The parse module 132 checks the syntax and semantics of the query using the information stored in the data dictionary 122. If the parser module 132 detects any syntactic or semantic errors, the errors are reported to the user.

Correct query statements are translated by the simplification module 136 into an equivalent logical algebraic operator graph 138.

The optimizer module 140 then receives this logical algebraic operator graph 138 and generates a query execution plan 142.

This resultant query execution plan 142 is then either translated into equivalent C++ code by the compilation module 144 to be executed at a later time (for embedded queries) or executed directly by the execution module 148 (for interactive queries). The results of the execution of the optimized and compiled or interpreted query execution plan 142 are presented to the user at 148.

One of the important features of the query processing module 112 is the ability to process queries that operate on complex objects.

A complex object is a conglomerate of independently existent objects which are logically related to each other. For example, a CHILDREN object and a PARENT object (which are independent but logically related) are part of a FAMILY complex object. The CHILDREN and PARENT objects may be complex objects as well. When the query processing module 112 retrieves this logically related information, the query processing module 112 is said to "assemble" a set of complex objects.

FIG. 4A–C illustrate exemplary complex object structures. FIG. 4A shows a balanced complex object structure in which each object 170, 172, and 174, except for leaf objects, 176, 178, 180 and 182, have two sub-objects. FIG. 4B illustrates a deep complex object structure in which each object 170, 172, 174, 176, 178, and 180, except for leaf object 182, has only one sub-object. FIG. 4C illustrates a shallow complex object structure in which each object 172, 174, 176, 178, 180 and 182 is a sub-object of root object 170, i.e., only the root object 170 has sub-objects associated with it and all other objects are leaf objects.

FIG. 5 shows a STUDENT INFORMATION complex object 160 with STUDENT 150, STATE 158, COUNTRY 154, MAJOR 156 and UNIVERSITY 152 sub-objects. An exemplary query requiring the assembly of the STUDENT-INFORMATION complex object 160 is: "Retrieve names, universities, and course major details of all students in universities in Texas".

Using a query execution graph as input, the query optimization module 140 generates a query execution plan for processing a given user query. Exemplary execution algorithms used in the query execution module 140 include access using path indexes, hybrid-hash join, pointer-based hybrid-hash join and the set operator called assembly.

The assembly operator (or assembly execution algorithm) implements the materialize logical operator (see José A. Blakeley, William J. McKenna, and Goetz Graefe, "Experiences Building the Open OODB Query Optimizer", *Proceedings of the* 1993 *ACM SIGMOD International Conference on the Management of Data,* and hereinafter referred to as "Blakeley et al."). Initially introduced by T. Keller, G. Graefe, and D. Maier (see T. Keller, G. Graefe, and D. Maier, Efficient Assembly of Complex Objects", *Proceedings of* 1991 *ACM SIGMOD International Conference on the Management of Data,* 148, hereinafter referred to as "Keller et al.") as part of the Revelation project.

The assembly operator enhances the set-oriented query processing of OODBMSs. Performance improvements in assembling complex objects with the assembly operator in comparison to object-at-a-time assembling were reported in Keller et al. Open OODB is one of the first OODBMSs to incorporate a query execution module 146 which allows OODBMSs to compete with RDBMSs in set-oriented query processing performance. An assembly procedure (an executable procedure implementing the assembly operator) is one of the procedures comprehended in the query optimization module 140 along with other procedures such as hybrid-hash join, indexed scan, etc.

Keller et al. describe one implementation of the assembly operator. The implementation of the assembly operator in Keller et al., however, assumed total control of the disk head (i.e., during execution of the assembly no other process will access the disk). This assumption is unrealistic in a client-server or multi-processor environment where query plans which have more than one operator that include assembly are processed. The problem is that since other processes along with the assembly operator will be concurrently accessing the disk, a situation referred to as disk interference is created. In a client-server or multi-processor environment, performance deteriorates as the frequency and number of disk interferences increases. Keller et al. do not address this performance problem in a client-server environment.

Thus, what is needed is an execution algorithm of the assembly operator in a client-server or multi-processor environment. What is also needed is a suitable interface for integrating the assembly operator into an OODBMS in a client-server or multi-processor environment.

SUMMARY OF THE INVENTION

The present invention includes a method and system for assembling complex objects in a client-server or multi-processor environment.

An assembly module is used to assemble complex objects from a plurality of objects stored on a disk of a server in response to user queries in an object-oriented database executing in a client-server environment or multi-processor environment. Each complex object comprises a plurality of objects including a root object and a plurality of logically related sub-objects. Each object has an associated disk storage location, indicating where on the disk the object is stored. Each object may also include references to other objects. A list references to root objects of the complex objects needed to process a given query is provided as input to the assembly module and stored in a reference list. A predetermined number of references in the reference list which are closest to the current disk head position are resolved into memory. Multiple objects are thus fetched from the disk in a single disk access. If the resolved objects includes references to other objects, those references are added to the reference list. The present invention continues processing the references in the reference list in this manner until all of the complex objects involved in the query are assembled.

BRIEF DESCRIPTION OF THE DRAWINGS

For a better understanding of the present invention, reference may be made to the accompanying drawings, in which.

DETAILED DESCRIPTION OF THE INVENTION

The present invention includes a method and system for assembling complex objects from disk into memory during query processing in an OODBMS executing in a client-server or multi-processor environment. Instead of operating on a single complex object, the present invention processes a set of complex objects concurrently. By concurrently processing a set of complex objects the pool of unresolved references is increased resulting in a higher optimization of disk accesses. Thus, at any point in the assembly process, unresolved references with minimum disk seek costs are resolved, fetched from disk, by the present invention.

Figure 1:
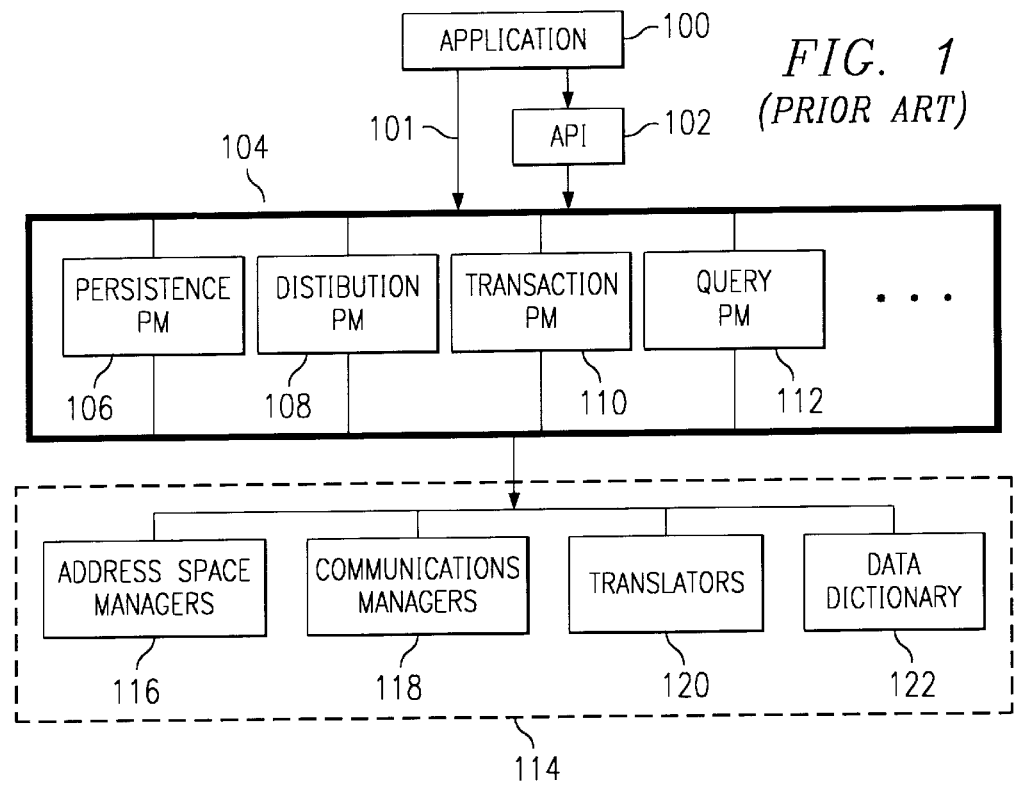
FIG. 1 illustrates an exemplary Open OODB architecture.
Figure 3:
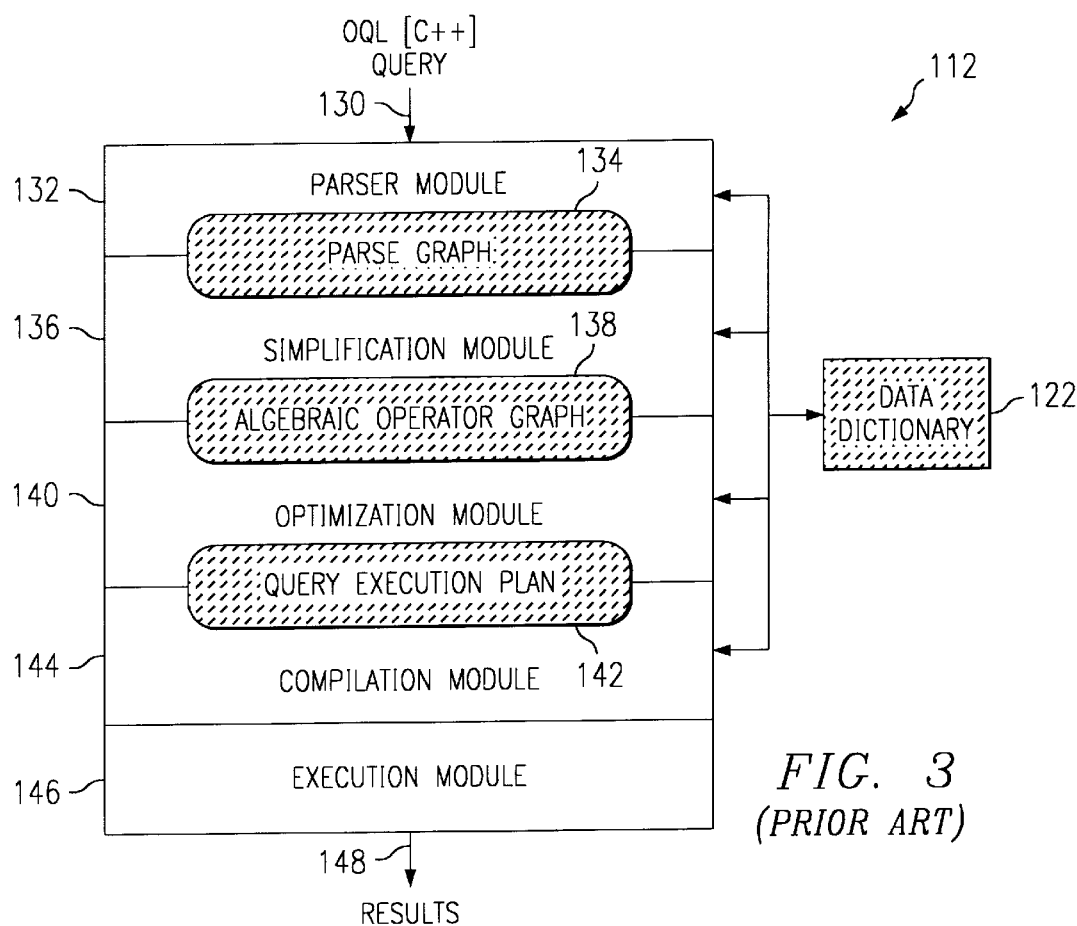
FIG. 3 shows the architecture for an exemplary Open OODB extensible query module.
Figure 2:
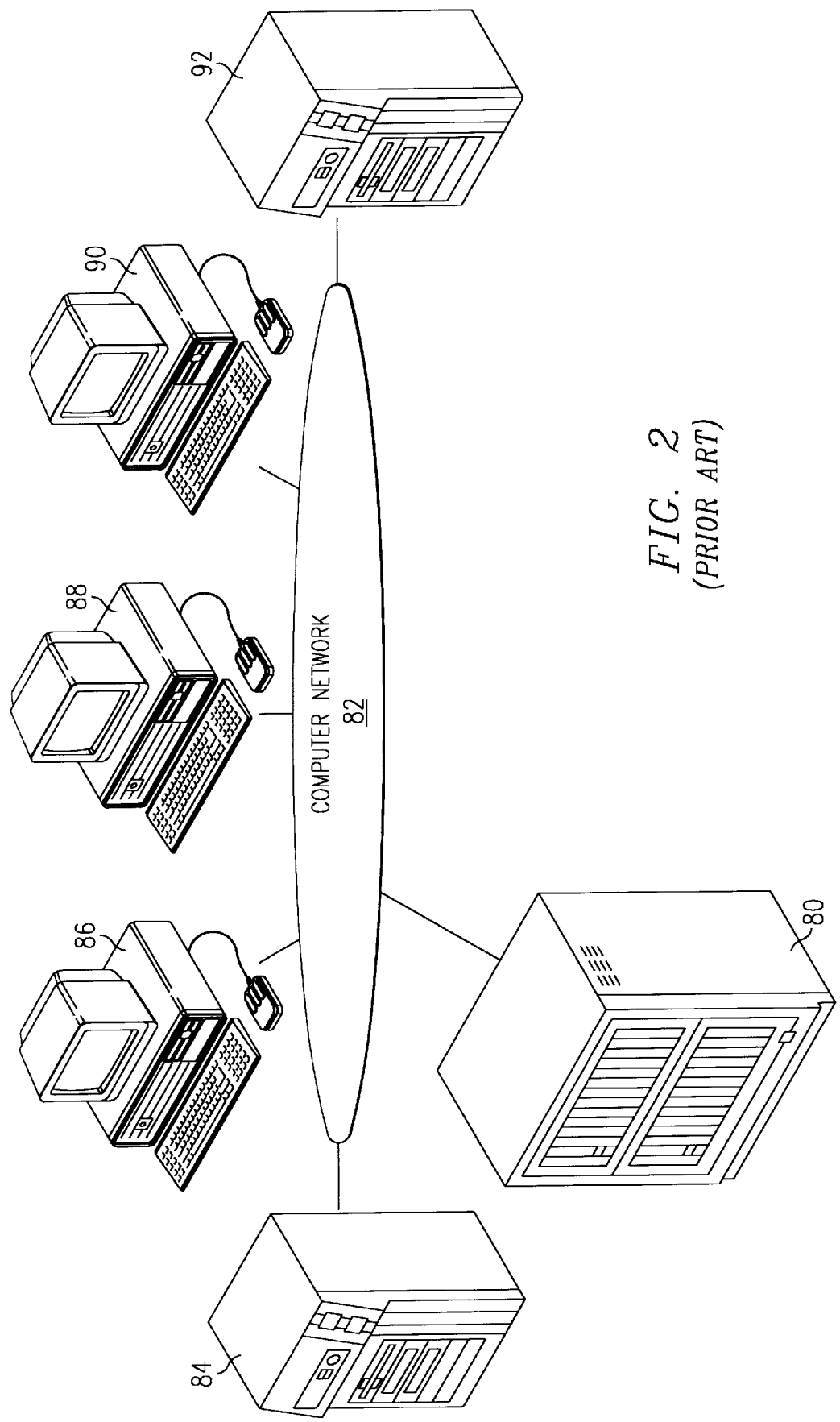
FIG. 2 shows an exemplary client-server or multi-processor system on which the exemplary Open OODB architecture executes.
Figure 4A:
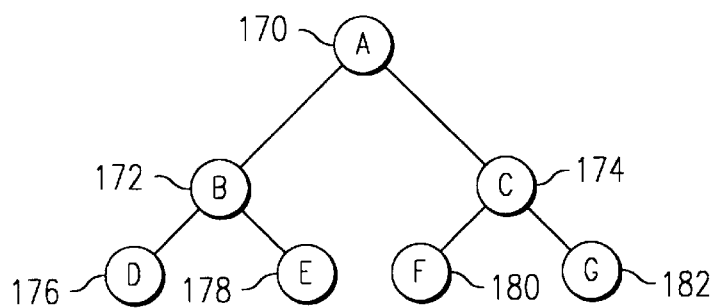
FIGS. 4A–C show exemplary complex object structures.
Figure 4B:
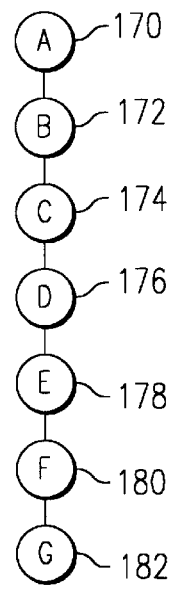
Figure 4C:
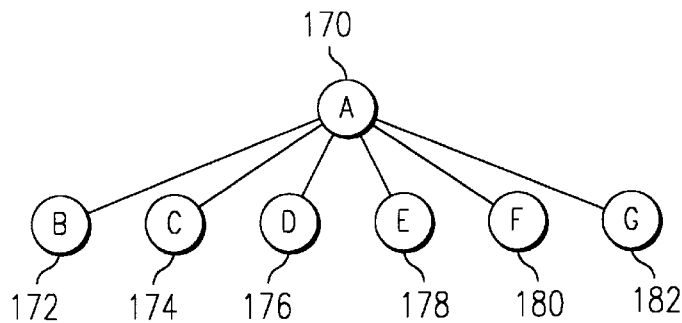
Figure 5:
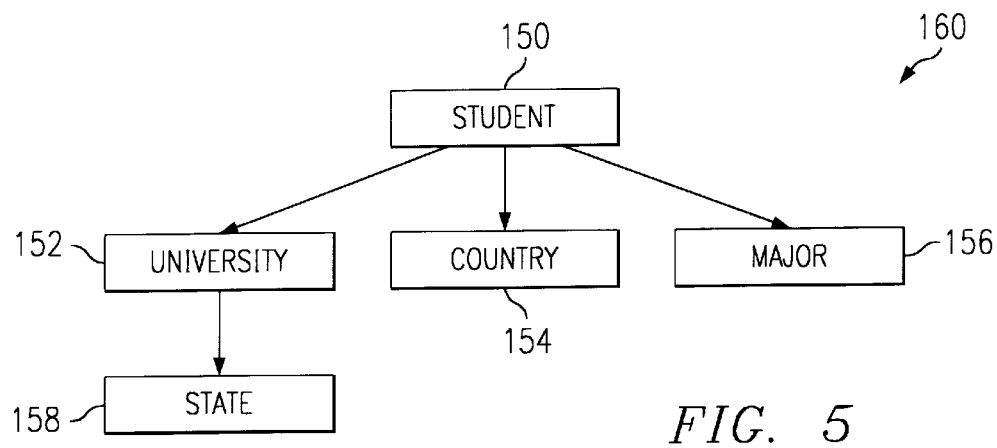
FIG. 5 illustrates an exemplary complex object.

Although the present invention is implemented in the context of the Open OODB system, it is contemplated that the present invention may be implemented as part of any OODBMS or ORDBMS. The present invention may be implemented using C++ or any other object-oriented programming language. The client-server, or multi-processor, environment contemplated is as shown in FIG. 2 where an application, executing on client computer 86, issues a query through the computer network 82 to an OODBMS executing on the server computer 80. The query processing module of the OODBMS executing on the server computer 80 includes the assembly procedure of the present invention as described in detail hereinbelow.

Figure 6:
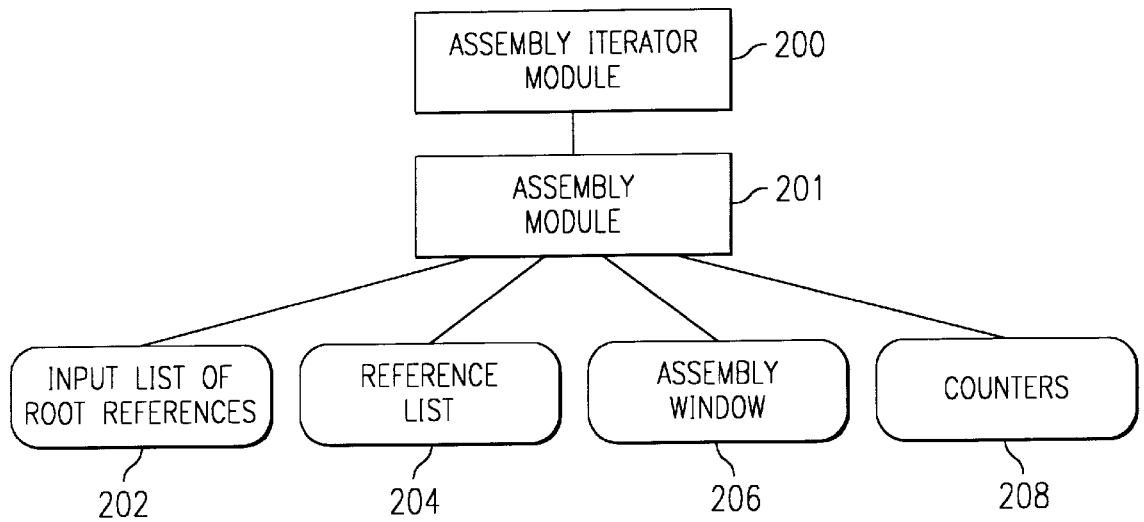
FIG. 6 is a block diagram illustrating the present invention.

The preferred embodiment of the present invention is shown in FIG. 6 and includes an assembly iterator module 200 which is coupled to and initiates an assembly module 201, discussed in more detail hereinbelow, for each query processed. The assembly module 201 is coupled to and uses an input list of root references 202, a reference list 204, an assembly window 206 and counters 208 to assemble complex objects to be used by the query processing module. Each of the data structures 202, 204, 206 and 208 are discussed in more detail hereinbelow.

Figure 7:
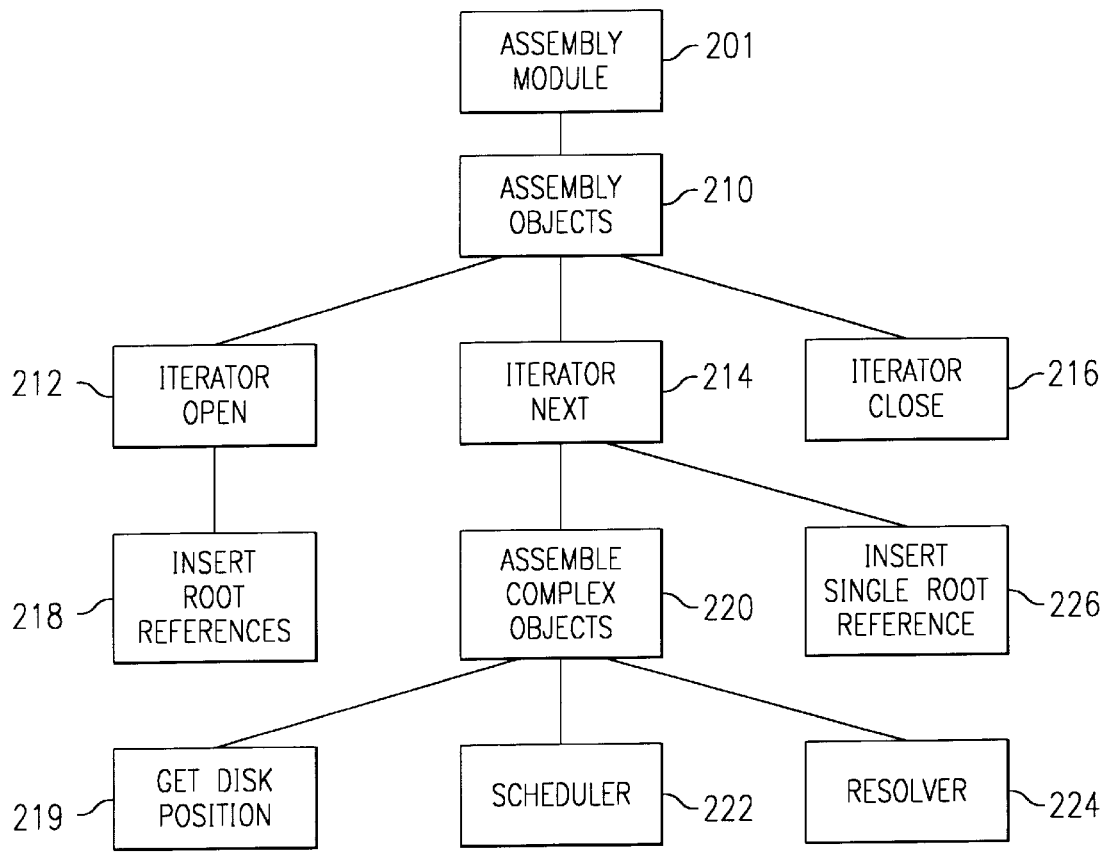
FIG. 7 is a block diagram illustrating the assembly module of the present invention.

FIG. 7 illustrates the assembly module 201 in more detail. As shown in FIG. 7, the assembly module 201 is coupled to an assemble objects module 210. The assemble objects module 210 is in turn coupled to and calls an iterator open module 212, an iterator next module 214 and an iterator close module 216. The iterator open module 212 is coupled to and calls an insert root references module 218. The iterator next module 214 is coupled to and calls an assemble complex objects module 220 and an insert root reference module 226. The assemble complex objects module 220 in turn is coupled to and calls a get disk head position module 219, a scheduler module 222 and a resolver module 224. The operation of each of the modules shown in FIG. 7 are discussed in more detail hereinbelow in conjunction with the flowchart shown in FIG. 8 which describes the operation of the assembly module 201 of the present invention.

In the present invention, the assembly module 201 accepts as input a window size; the input list of root references 202 and numrefs, the number of objects to be fetched in a single disk access. Each root reference in the input list of root references 202 to a complex object also includes a count indicating the number of sub-objects which comprise the complex object. The output from the assembly module 201 is thus a set of complex objects assembled in main memory of a client computer with minimum disk seek costs.

The input list of root references 202 is a list references to all root objects which must be assembled in order to carry out the processing of the currently executing user queries. Each root object reference in the input list 202 includes an associated disk address corresponding to the disk storage location of the data represented by the root object. Each of the data objects referenced by the root object may include also one or more references to other data objects which are logically related to each other in accordance with the relationships maintained in the object-oriented database.

The reference list 204, implemented, for example, as a doubly-linked list is stored in the main memory of the server computer 80, is a list of unresolved root object references and unresolved object references. Each of the object references, like the root object references, includes an associate disk address corresponding to the disk storage location of the data represented by the object reference. The total number of references, both root object references and object references, in the reference list 204 is referred to as the reference list size.

The window 206 data structure is a block of memory in the main memory of the server computer 80 in which the complex objects are assembled by the assembly module 201 of the present invention. The number of complex objects that can be assembled in the window 206 is referred to the window size. Thus, the memory is divided into a plurality of partitions in accordance with the window size.

Each of the counters 208 is associated with one of the partitions of the window 206 into which a complex object is assembled. The counters 208 are incremented as object references are resolved into the associated memory partition and removed from the reference list 204. Each counter 208 thus indicates when the complex object being assembled in a particular partition of the window 206 has been completely assembled.

Figure 8:
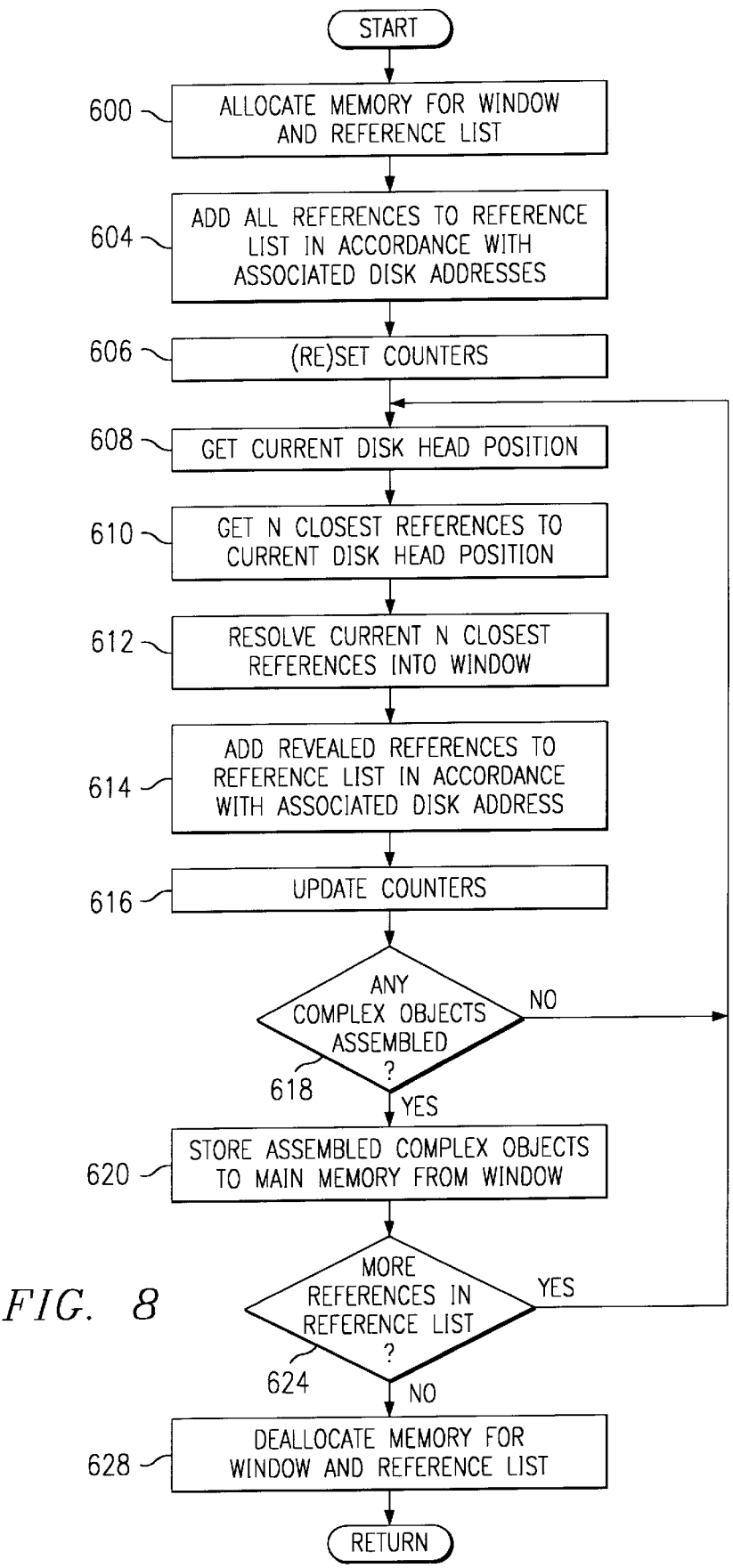
FIG. 8 is a flow diagram illustrating the operation of the present invention.

In the preferred embodiment of the present invention, the operation of which is depicted in the flowchart shown in FIG. 8 all of the root object references in the input list 202 are sorted and stored in the reference list 204 at the initial stage of the assembly process. With numrefs equal to 1, only one reference is resolved from the reference list 204 with each disk access. It is contemplated, however, for optimum performance in a client-server, or multi-processor, environment, that numrefs is equal to the window size, i.e., greater than one, thereby allowing multiple objects to be fetched, and thus multiple references to be resolved, in a single disk access.

As shown in FIG. 7, the assembly module 201 calls the assemble objects module 210 which, as shown at block 600, FIG. 8 allocates memory for the assembly window 206 and the reference list 204. Returning to FIG. 7, the assemble object module 210 then calls the iterator open module 212 which calls the insert root references module 218.

The insert root references module 218 inserts all root references from the root reference input list 202 into the reference list 204, as shown at block 60 in FIG. 8. The root references are added to the reference list 204 in accordance with their associated disk address thereby keeping the references in the reference list 204 ordered by their disk location. For each of the root references added to the reference list 204, a partition of the assembly window 206 in memory is allocated into which the associated complex object is to be assembled. The insert root references module 218 then sets one of a plurality of counters 208 for partitions, as shown at block 606 in FIG. 8. The counters 208, as discussed in more detail hereinabove, are used to determine when a complex object has been completely assembled.

The assemble object module 210 then calls the iterator next module 214 which in turn calls the assemble complex objects module 220.

The assemble complex module 220 first calls the get disk position module 219, as shown at block 608 in FIG. 8, to determine the current position of the disk read head. In accordance with the current disk head position determination, the scheduler module 222 determines the N closest unresolved references to the current disk head position, as shown at block 610 in FIG. 8 and provides those N references to the assemble complex object module 220. As discussed hereinabove, it is contemplated that for optimum performance in a client-server, or multi-processor, environment, N is equal to the window size, i.e., greater than one, so that more than one reference is resolved with each disk access.

The assemble complex object module 220 then calls the resolver module 224. The resolver module 224 resolves the N references, as shown at block 612 in FIG. 8, and stores the resulting data into an appropriate partition of the window 206. In resolving the N references, the resolver module 224 first copies the data referenced by each of the N references from disk in accordance with their associated disk addresses. The retrieved data is then stored into the appropriate partitions of the assembly window 206. The resolved references are removed from the reference list 204. Any new references revealed by the resolver module 224 are added to the reference list 204 in accordance with their associated disk addresses, as shown at block 614 in FIG. 8. Then, at block 616 in FIG. 8, the counters 208 associated with the appropriate partitions of the assembly window 206 are update.

The assemble complex objects module 220 repeatedly calls the get disk head position module 219, the scheduler module 222 and the resolver module 224. If, at decision block 618 in FIG. 8, it is determined that no complex object is assembled, processing continues a block 608 in FIG. 8.

If it is determined at decision block 618 in FIG. 8 that a complex object has been assembled, processing continues at block 620 in FIG. 8 where the assembled complex objects are removed from their associated partitions of the window 206 into the main memory associated with the requesting processor.

After the assembled complex objects are stored to the main memory associated with the requesting processor at block 620 in FIG. 8, if there are no more references in the reference list 204, as determined at decision block 624 in FIG. 8, control returns to the assemble objects module 210 which deallocates the memory reserved for the window 206 and the reference list 204. The assemble object module 210 then returns control to the assembly module 201.

As discussed hereinabove, the present invention operates on a set of complex objects concurrently and schedules fetching of multiple component objects with each disk access. By operating on a set of complex objects concurrently and fetching multiple component objects with each disk access, the number of ways in which the objects can be fetched are increased, leading to greater optimization of disk seeks.

Figure 9A:
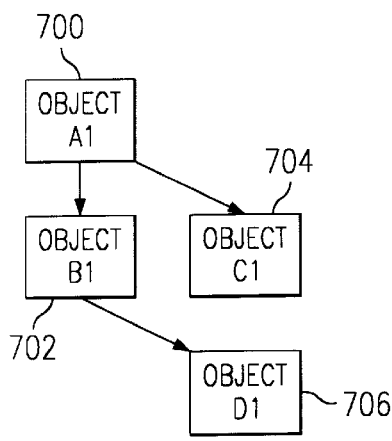
FIGS. 9A–D illustrate an exemplary assembly of three complex objects in accordance with the present invention.
Figure 9B:
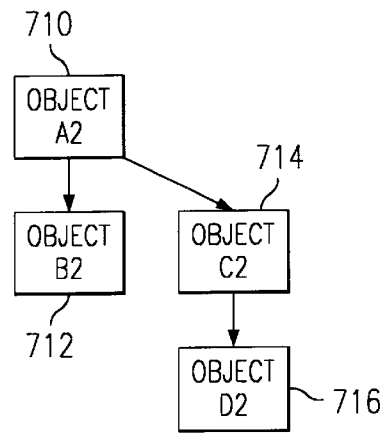
Figure 9C:
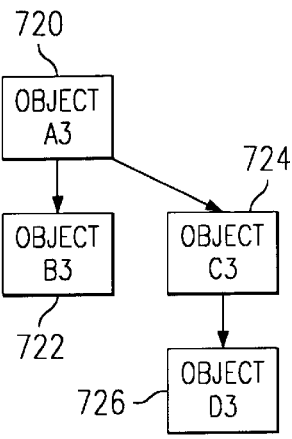
Figure 9D:
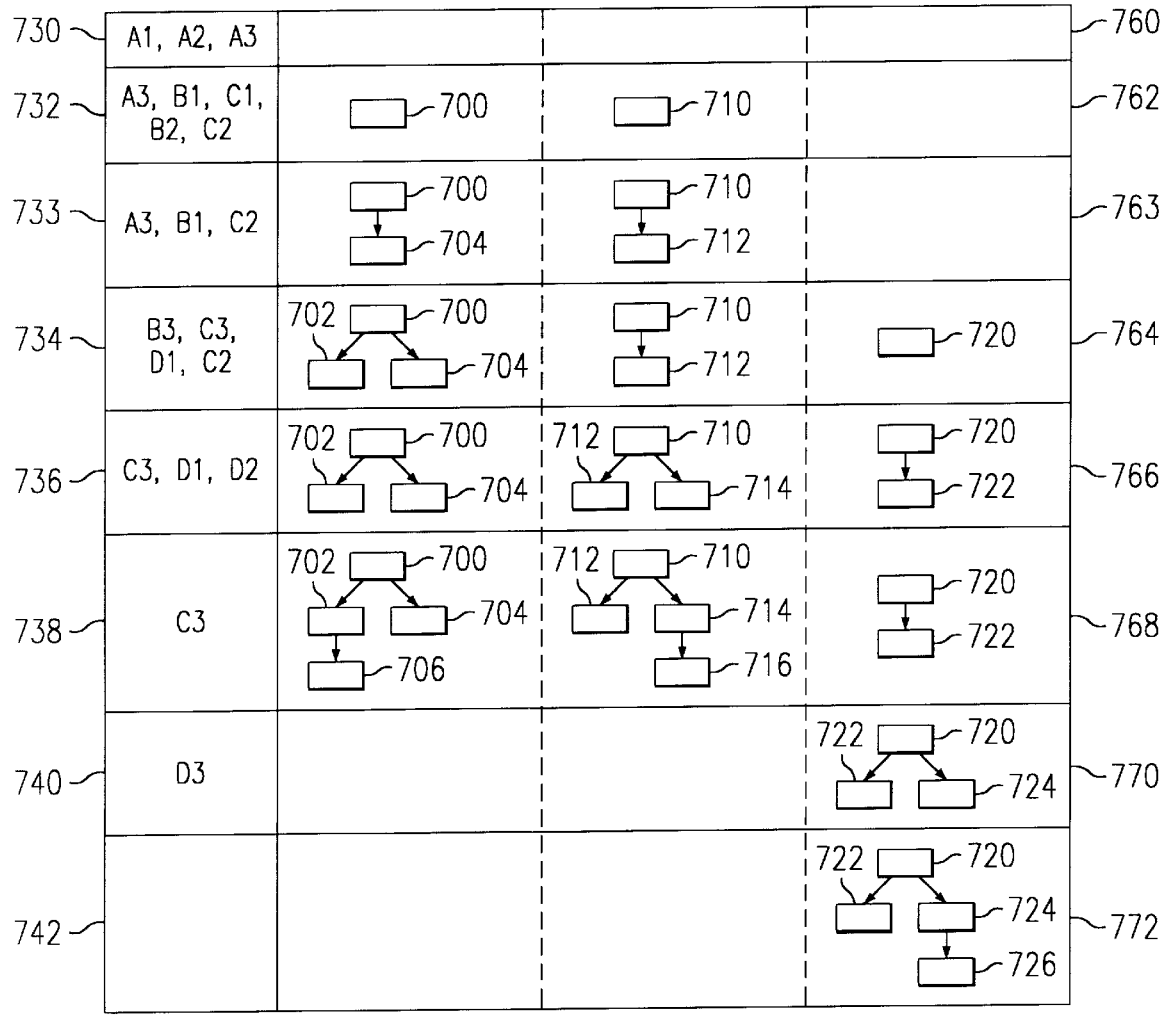

Consider, as an example, the assembly of the three complex objects shown in FIGS. 9A–C using the assembly procedure implemented in the assembly module 201 of the present invention. The content of the reference list 204 and the assembly window 206 at various stages of the process are shown in FIG. 9D. Blocks 730–742 show the content of the reference list 204 and blocks 760–772 show the content of the assembly window 206. Assume the number of references to be resolved with each disk access, numrefs, is two.

The assembly module 201 begins execution by adding the root references, object A1 700, object A2 710, and object A3 720, into the reference list 204. Blocks 730 and 760 show the resulting content of the reference list 204 and the assembly window 206, respectively. Since three complex objects are to be assembled, the assembly window 206 is divided into three partitions as shown in block 760, each of the partitions associated with one of the complex objects to be assembled.

Since numrefs is equal to two, the two references closest to the current disk head position, assumed to be object A1 700 and object A2 710, are resolved first.

After resolving object A1 700 and object A2 710, four new unresolved references are added to the reference list 204 as shown in block 732, object B1 702, object C1 704, object B2 712 and object C2 714. Object A1 700 and object A2 710, after the corresponding data is retrieved from disk, are included in their respective partitions of the assembly window 206, as shown at block 762.

Next, assuming object C1 704 and object B2 712 are closest to the current disk head position, object C1 704 and object B2 712 are resolved, resulting in additional references being placed in the reference list 204 as shown in block 733. The resulting contents of the associated partitions of the assembly window 206 are shown in block 763.

Resolving object A3 720 and object B1 702, assuming they are the two closest objects to the current disk head position, results in object B3 722, object C3 724 and object D1 706 being placed into the reference list 204, as shown in block 734. The resulting contents of the associated partitions of the assembly window 206 are shown in block 764.

Object B3 722 and object C2 714 are resolved next, resulting in the reference list 204 and associated partitions of the assembly window 206 as shown in blocks 736 and 766, respectively.

Assuming object D1 706 and object D2 716 are closest to the current disk head position and are thus resolved next, blocks 738 and 768 depict the resulting contents of the reference list 204 and the associated partitions of the assembly window 206, respectively. This results in the complete assembly of the complex objects shown in FIGS. 9A and 9B. Thus, as shown in blocks 740 and 770 of FIG. 9D, a new object reference, i.e., for the object D3 726, is added to the reference list 204 and the complex objects shown in FIGS. 9A and 9B are removed from the associated partitions of the assembly window 206 and stored to the main memory of their requesting processors.

Processing continues in a similar fashion until the complex object shown in FIG. 9C is also completely assembled.

Exemplary pseudo code for the assembly module 201 of the present invention is given in Appendix A, herein incorporated by reference in it's entirety.

Assumptions and notations used in developing the pseudo-code shown in Appendix A implementing the assembly operation of the present invention include:

Functions are categorized into main functions and sub-functions. Main functions call sub-functions and sub-functions manipulate basic data structures. In the pseudo-code, main functions are described in detail and sub-functions at the interface level.

Each main function has an identity, i.e. "Function-X()", and the function is described between "BEGIN Function-X( )" and "END Function-X( )" statements. A "CALL Function-X( )" statement represents calling of "Function-X( )".

Main and sub-functions belong to a particular class. The class to which functions belongs is also specified in the pseudo code. For main functions, the class to which it belongs is specified below the "BEGIN Function-X()" statement. For sub-functions, the class is specified at the location where the sub-function is called.

Control structures like "If Conditions" and "Iterative Loops" are represented by "IF CONDITION" and "FOR LOOP" statements. Each control structure has a unique identity such as identity "IF1" for an "If Condition" and identity "L1" for an "Iterative Loop".

Although the present invention has been described in detail, it should be understood that various changes, substitutions and alterations can be made thereto without departing from the spirit and scope of the present invention as defined by the appended claims.

APPENDIX A

CALL Assemble_Set_of_Objects()
BEGIN Assemble_Set_of_Objects()
SCOPE = To assemble a set of complex objects
CLASS = NOTHING SPECIFIC
Allocate memory required for the window and the reference list
CALL Iterator_open()
FOR LOOP L1
NMBR OF ITERATIONS = Number of complex objects to be assembled
CALL Iterator_Next()
NEXT L1
CALL Iterator_Close()
END Assemble_Set_of_Objects()
BEGIN Iterator_Open()
SCOPE = open() interface of the assembly operator
CLASS = ASSEMBLY_ITERATOR
CALL Insert_W_Root_References()
END Iterator_Open()
BEGIN Insert_W_Root_References()
SCOPE = Insert window size number of root references into the reference list
CLASS = ASSEMBLY
FOR LOOP L2
NMBR OF ITERATIONS = Window size
Get the next available root reference
Insert the root reference into the reference list
NEXT L2
END Insert_W_Root_References()
BEGIN Iterator_Next()
SCOPE = next() interface of the assembly operator
CLASS = ASSEMBLY_ITERATOR
CALL Assemble_Complex_Object()
CALL Insert_Single_Root_Reference()
END ITERATOR_NEXT()
BEGIN Assemble_Complex_Object()
SCOPE = Assemble a single complex object
CLASS = ASSEMBLY
FOR LOOP L3
NMBR OF ITERATIONS = Depends on the condition IF1 (INFINITE LOOP)
IF CONDITION IF1
CONDITION = A complex object is assembled
Break the LOOP L3 and return the assembled complex object
END IF1
FOR LOOP L4
NMBR OF ITERATIONS = Numrefs
Get an object reference nearest to the current disk arm from the reference list
Fetch the object from the disk corresponding to the reference just got from the reference list
Compute the disk seek cost
Store the just fetched object in a specified location in the main memory
Increment the counter for that window slot to register for an object fetch
Extract the object references from the just fetched object and insert them into the reference list
NEXT L4
NEXT L3
END Assemble_Complex_Object()
BEGIN Insert_Single_Root_Reference()
SCOPE = Insert a root reference into the reference list
CLASS = ASSEMBLY
Get the next available root reference
Insert the root reference into the reference list
Initialize the counter for the window slot to register reading of a new root reference
END Insert_Single_Root_Reference()
BEGIN Iterator_Close()
SCOPE = close() interface of the assembly operator
CLASS = ASSEMBLY_ITERATOR
Free the memory allocated for the window and the reference list
END Iterator_Close()
© 1994 TEXAS INSTRUMENTS INCORPORATED

What is claimed is:

1. A system for assembling complex objects in an object-oriented database management system in a multi-processor environment comprising:

a first processor including a first memory and a disk, said disk having a plurality of storage locations and a disk read head for accessing each of the plurality of storage locations;

a database comprising a plurality of objects, each of said plurality of objects stored in one of said plurality of storage locations on said disk, said plurality of objects including root objects and reference objects;

an assembly module executing on said first processor for accepting a list of root references to be resolved in response to a user query, each of said root references related to one of said root objects and including an associated storage address to indicate where said related root object is stored on said disk;

an assemble objects module coupled to said assembly module and executing on said first processor for allocating a portion of said first memory to an assembly window and a reference list, said reference list including unresolved references to said plurality of objects stored on said disk;

an iterator open module coupled to said assemble objects module and executing on said first processor for adding said list of root references to said reference list;

an iterator next module coupled to said assemble objects module and executing on said first processor for resolving said unresolved references in accordance with how close said unresolved references are to a current position of said disk read head to generate resolved references, for storing said objects referenced by said resolved references to said assembly window, for detecting complete assembly of one of said complex objects to generate an assembled complex object and for moving said assembled complex object from said window to a second memory associated with a second processor; and an iterator close module coupled to said assemble objects module and executing on said first processor for deallocating said portion of said first memory after assembling all complex objects involved in said user query.

2. The system of claim 1 wherein said first processor is said second processor.

3. A method for assembling complex objects from a plurality of objects stored on a disk associated with a first computer, each of said complex objects comprising a root object and a plurality of referenced objects, said disk including a disk read head for accessing said plurality of objects stored on said disk, the method comprising the steps of:

providing a list of root references to be resolved, one of said root references including a reference to said root object, said reference to said root object including an associated storage location to indicate where said root object is stored on said disk;

allocating a first portion of a memory associated with said first computer to an assembly window;

allocating a second portion of said memory to a reference list;

storing said list of root references in said reference list;

determining a current position of said disk read head;

copying said objects associated with a predetermined number of said references in said reference list from said disk to said assembly window in accordance with how close said predetermined number of said references is to said current position of said disk read head to generate resolved references;

adding additional references to said reference list in response to said copying step; and repeating said determining step, said copying step and said adding step until at least one of said complex objects has been assembled to generate an assembled complex object.

4. The method of claim 3 wherein the step of allocating a first portion of said memory includes the steps of:

associating a plurality of counters with said assembly window;

adjusting said plurality of counters in response to said copying step and in response to said adding step; and determining assembly of said at least one of said complex objects in accordance with said plurality of counters.

* * * * *